United States Patent [19]
Schneider

[11] 3,918,830
[45] Nov. 11, 1975

[54] MOTOR-PUMP AGGREGATE FOR USE IN NUCLEAR REACTORS

[75] Inventor: Wolfgang Schneider, Hessheim, Germany

[73] Assignee: Sulzer KSB Kernkraftwerkspumpen GmbH, Frankenthal, Pfalz, Germany

[22] Filed: June 4, 1973

[21] Appl. No.: 367,013

[30] Foreign Application Priority Data
June 6, 1972 Germany.................. 2227357

[52] U.S. Cl................ 415/122; 192/12 B; 74/572; 417/424; 192/41 R
[51] Int. Cl....................... F16d 67/02; F01d 15/12
[58] Field of Search........... 192/12 R, 12 B, 12 BA, 192/15, 17 D; 415/122, 123; 74/572

[56] References Cited
UNITED STATES PATENTS

| | | | |
|---|---|---|---|
| 2,629,469 | 2/1953 | Dayton | 192/12 B |
| 2,699,293 | 1/1955 | Svendsen | 74/572 X |
| 3,055,471 | 9/1962 | Warn et al. | 192/12 B X |
| 3,263,459 | 8/1966 | Bochan et al. | 192/12 BA |
| 3,451,512 | 6/1969 | Sacchini et al. | 192/12 BA |
| 3,523,593 | 8/1970 | Karasick | 192/12 B X |
| 3,581,854 | 6/1971 | Versoy | 192/12 B |

Primary Examiner—Samuel Scott
Assistant Examiner—Lance W. Chandler
Attorney, Agent, or Firm—Michael S. Striker

[57] ABSTRACT

A motor-pump aggregate for use in nuclear reactor plants wherein the motor shaft carries a flywheel and is connected to the pump shaft by a coupling having two flanges one of which is mounted on the motor shaft and the other of which is mounted on the pump shaft and receives torque from the one flange by way of claws. An overrunning clutch is installed between the motor shaft and the one flange so that the pump shaft can rotate at a speed exceeding the speed of the motor shaft, for example, due to turbine effect in the event of breakage of one of the main lines for coolant. A blocking device prevents rotation of the motor shaft counter to the direction in which the shafts rotate when the motor drives the pump.

8 Claims, 3 Drawing Figures

MOTOR-PUMP AGGREGATE FOR USE IN NUCLEAR REACTORS

BACKGROUND OF THE INVENTION

The present invention relates to improvements in motor-pump aggregates, and more particularly to improvements in motor-pump aggregates which can be used with advantage in nuclear reactor plants. Still more particularly, the invention relates to improvements in the torque-transmitting connection between the rotary output shaft of a prime mover and the shaft of a pump, such as a primary centrifugal recirculating pump in a nuclear reactor.

It is known to connect the output shaft of an electric motor with the shaft of a nuclear reactor pump by means of a rigid or flexible coupling. If the two shafts are rigidly coupled to each other, they may be mounted in common bearings. When the coupling is not rigid, separate bearings are provided for the pump shaft and for the motor shaft. As a rule, the aggregate including a nuclear reactor pump and a motor therefor comprises at least one large flywheel which insures that the cooling of solid fuel rods is not interrupted in immediate response to interruption of energy supply to the motor. The flywheel is normally secured to the output shaft of the motor. The presence of a flywheel presents certain problems, especially in the event of accidental breakage of a main (suction or pressure) pipe for the coolant. This brings about a very substantial pressure differential (corresponding to the difference between maximum operating pressure and atmospheric pressure) so that the pump shaft tends to rotate at a speed greatly exceeding the speed of the motor shaft due to the well known turbine effect. Such tendency of the pump shaft should not adversily influence the position and/or mounting of the flywheel. However, whenever the pump shaft tends to rotate or rotates at an excessive speed, the hub of the flywheel is subjected to very high stresses which must be counteracted by one or more costly precautionary measures including making the hub of the flywheel a press-fit on the motor shaft and by securing the hub to the shaft by means of screws, bolts, wedges, tongueand-groove connections, by shrinking the hub onto the motor shaft or by providing other suitable torque transmitting means between these parts. All this contributes to excessive concentration of stresses in the motor shaft and/or the hub of the flywheel when the aggregate is in normal use.

The rotation of flywheel counter to the direction of desired rotation of the pump shaft is prevented by employing a blocking device (such as a one-way clutch or a ratchet-and-pawl assembly). The blocking device is normally mounted at that end of the motor shaft which is remote from the pump shaft.

SUMMARY OF THE INVENTION

An object of the invention is to provide a novel and improved connection between the prime mover and a pump, especially a pump which is used in a nuclear reactor plant.

Another object of the invention is to provide a motorpump aggregate wherein the parts of the motor cannot be subjected to excessive stresses when the pump shaft tends to or actually rotates at a speed exceeding that of the motor shaft.

A further object of the invention is to provide novel and improved torque transmitting means between the shaft of an electric motor and the shaft of a pump in a nuclear reactor plant.

An additional object of the invention is to provide a motor-pump aggregate which can employ a series-produced motor and need not utilize oversized bearings for the motor shaft even though the pump shaft is permitted to rotate at a speed exceeding that of the motor shaft.

A further object of the invention is to provide an aggregate which can be installed in a nuclear reactor plant as a superior substitute for existing motor-pump aggregates.

An ancillary object of the invention is to provide a novel and improved torque transmitting connection between a series-produced electric motor and the shaft of a centrifugal pump in a nuclear reactor plant.

The invention is embodied in an aggregate, particularly for use in nuclear reactor plants, which comprises a prime mover (preferably a series-produced electric motor) having an output shaft which is rotatable in a predetermined direction and is rigid with a flywheel, a pump having a second shaft which drives the impeller and is coaxial or substantially coaxial with the output shaft, and novel and improved torque transmitting means between the shafts. The torque transmitting means includes a coupling having a first flange on the output shaft, a second flange on the second shaft, teeth, claws, jaws, or analogous projections for rotating the second flange in response to rotation of the first flange in the predetermined direction, and overrrunning or one-way clutch means interposed between one of the flanges and the respective shaft and being arranged to permit rotation of the second shaft relative to the output shaft when the speed of the second shaft in the predetermined direction exceeds the speed of the output shaft.

The aggregate preferably further comprises blocking means which prevents rotation of the second shaft and/or output shaft counter to the predetermined direction. Such blocking means may include an annulus of sprags or the like concentrically surrounding the overrunning clutch means.

The novel features which are considered as characteristic of the invention are set forth in particular in the appended claims. The improved aggregate itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
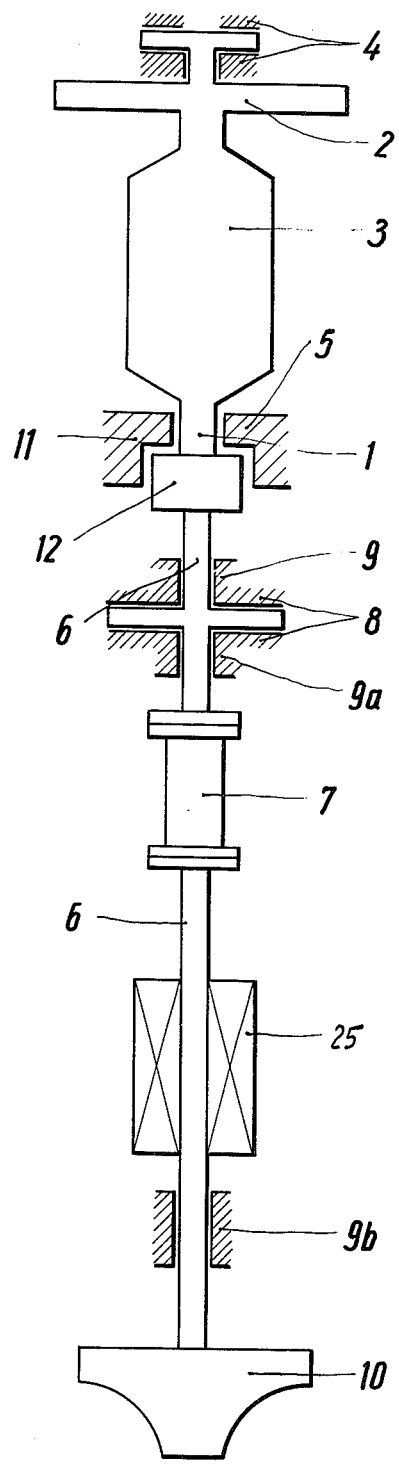
FIG. 1 is a fragmentary diagrammatic elevational view of a motor-pump aggregate which embodies the invention.

Referring first to FIG. 1, there is shown the rotor 3 of a prime mover which is a series-produced electric motor and has an output shaft 1. The motor is located at a level above a pump having a two-piece shaft 6 the lower portion of which carries an impeller 10. The upper portion of the output shaft 1 is journalled in a combined radial and thrust bearing 4 and carries a flywheel 2. The lower portion of the shaft 1 is rotatable in a radial antifriction bearing 5 which is installed in a stationary support 11. The two portions of the pump shaft 6 are connected to each other by a rigid coupling 7 of any known design. A sealing device 25 is provided in the region where the shaft 6 extends from the housing of the pump which includes the impeller 10. The sealing device 25 may be of the type desclosed, for example, in the copending application Ser. No. 353,133 filed by Peter Stech on Apr. 20, 1973 or in the copending application Ser. No. 353,135 filed by Dusan Florjancic on Apr. 20, 1973.

The upper portion of the pump shaft 6 is rotatable in a double-acting thrust bearing 8 and in two radial antifriction bearings 9, 9a which are respectively located above and below the thrust bearing 8. A further radial bearing 9b for the pump shaft 6 is provided between the impeller 10 and the sealing device 25. At least one of the bearings 9, 9a, 9b can be omitted.

Figure 2:
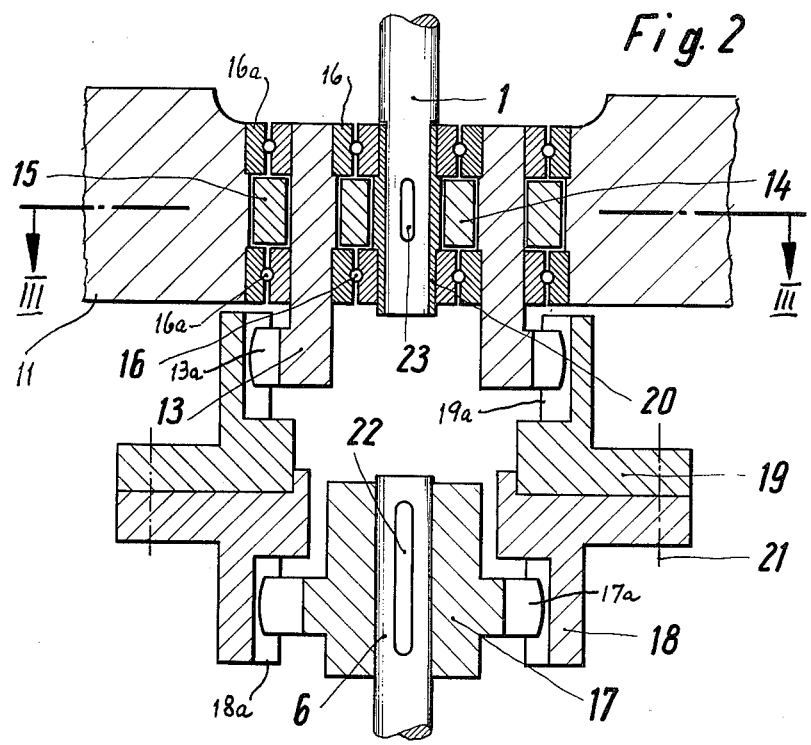
FIG. 2 is an enlarged axial sectional view of the torque transmitting means between the pump shaft and the motor shaft.
Figure 3:
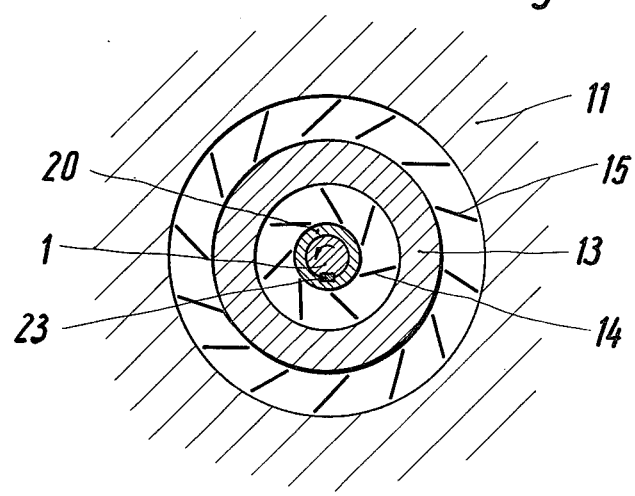
FIG. 3 is a sectional view as seen in the direction of arrows from the line III—III of FIG. 2.

In accordance with a feature of the invention, the output shaft 1 can rotate the pump shaft 6 in a predetermined direction (e.g., in a clockwise direction, as viewed in FIG. 3) by way of a novel torque transmitting device 12 the details of which are illustrated in FIGS. 2 and 3. The arrangement is such that the pump shaft 6 can rotate relative to the output shaft 1 when its speed (in a clockwise direction) exceeds the speed of the shaft 1.

As shown in FIG. 2, the output shaft 1 is connected with a first flange 13 by means of a key 23, a sleeve 20 and an overrunning clutch 14 which operates between the sleeve 20 and flange 13. A second flange 17 is secured to the upper portion of the pump shaft 6 by a key 22 and is provided with an annulus of teeth, claws or analogous projections 17a mating with internal projections or claws 18a of a claw ring 18 which is secured to a substantially mirror symmetrical claw ring 19 by screws, bolts or analogous fasteners 21. The projections or claws 19a of the ring 19 mate with the projections or claws 13a of the flange 13. The flange 13 rotates in two radial antifriction bearings 16a installed in the stationary support 11. Two additional antifriction bearings 16 are the opposite axial ends of the overrunning clutch 14.

A blocking device 15 which is coaxial with the overrunning clutch 14 is installed between the flange 13 and the stationary support 11 to prevent the output shaft 1 and its flange 13 (and hence also the flange 17 and pump shaft 6) from rotating in a counterclockwise direction. The blocking device 15 may comprise an annulus of sprags or analogous blocking elements which do not interfere with rotation of the flange 13 in a clockwise direction but become operative when the flange 13 tends to rotate counterclockwise.

The bearings 16 and 16a of FIG. 2 can be provided in addition to or as a substitute for the radial motor bearing 5 of FIG. 1. For example, the dimensions of the bearings 16a can be readily selected in such a way as to render the bearing 5 unnecessary.

It is clear that the means 13a, 19a, 19, 21, 18 18a. 17a for rotating the shaft 6 clockwise in response to clockwise rotation of the output shaft 1 can be replaced by other types of motion transmitting means. For example, the flanges 13, 17 may form part of a flexible coupling or they can be directly bolted or otherwise rigidly secured to each other.

Furthermore, it is equally within the purview of the invention to install the overrunning clutch 14 (or an analogous one-way clutch) between the flange 17 and the pump shaft 6, as long as the overrunning clutch insures that the pump shaft 6 can rotate relative to the motor shaft 1 when its RPM (in a clockwise direction) exceeds the RPM of the output shaft 1.

When the motor including the parts 1, 2, 3 is started, it rotates the impeller 10 of the pump by way of the parts 23, 20, 14, 13, 13a, 19a, 19, 21, 18, 18a, 17a, 17, 22, upper portion of the pump shaft 6, rigid coupling 7 and lower portion of the pump shaft 6. If the pump shaft 6 begins to rotate at a speed exceeding the speed of the output shaft 1, the overrunning clutch 14 insures that the shaft 6 cannot drive the shaft 1. This renders it possible to drive the pump by resorting to a series-produced electric motor wherein the connection between the flywheel 2 and the output shaft 1 need not be stronger than necessary for normal operation of the aggregate. The shaft 6 is likely to rotate due to the aforementioned turbine effect in response to a break in the pressure pipe for coolant. In the event of such break, the motor continues to drive its shaft 1 at the selected speed while the pump shaft 6 rotates relative to the shaft 1. If the break occurs in the main suction pipe, i.e., if the pump shaft 6 tends to rotate in a counterclockwise direction, the blocking device 15 prevents any rotation of the output shaft 1 in a counterclockwise direction. The pump shaft 6 is then held against rotation by the parts 11, 15, 13, 13a, 19a, 19, 21, 18, 18a, 17a, 17 and 22. The blocking device 15 can be readily dimensioned in such a way that it can effectively prevent rotation of the pump shaft 6 in a counterclockwise direction. As mentioned above, the exact construction of the blocking device 15 does not form part of the present invention; if desired, the blocking device may resemble the overrunning clutch but is mounted in such a way that it does not permit rotation of the shafts 1 and 6 in a counterclockwise direction.

An important advantage of the improved torque transmitting means between the shafts 1 and 6 is that the connection between the shaft 1 and the flywheel 2 is not adversely affected when the speed of the pump shaft 6 (in the predetermined direction in which the pump can be driven by the motor) exceeds the speed of the output shaft 1. Therefore, the parts 1, 2 and the connection therebetween must be designed and assembled only with a view to insure satisfactory and reliable operation in normal use.

Another advantage of the improved torque transmitting means is that it enables the manufacturer to dispense with at least one bearing (5) for the output shaft 1 by the simple expedient of properly dimensioning the bearing or bearings between the elements of the torque transmitting means. This also applies for one or more bearings for the upper portion of the pump shaft 6.

The improved torque transmitting means is versatile in that it can be installed between the output shaft 1 and its flange or between the pump shaft 6 and its flange. The same holds true for the mounting of the blocking device 15. Furthermore, the torque transmitting means can employ all or nearly all available types of overrunning clutches and/or blocking devices. If the coupling which forms part of the torque transmitting connection is a flexible coupling, at least one of the shafts 1, 6 should be journalled in at least two bearings.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. An aggregate, particularly for use in nuclear reactor plants, comprising a prime mover having an output shaft rotatable in a predetermined direction; a fly wheel fixed to said output shaft for rotation therewith; a pump having a second shaft coaxial with said output shaft; torque transmitting means between said shaft including a coupling having a first flange on said output shaft, a second flange on said second shaft, means for rotating said second flange in response to rotation of said first flange in a predetermined direction, and overrunning clutch means interposed between one of said flanges and the respective shaft and arranged to permit rotation of said second shaft relative to said output shaft when the speed of said second shaft in said predetermined direction exceeds the speed of said output shaft; a stationary support; first antifriction bearing means interposed between said stationary support and said one flange; and second antifriction bearing means interposed between said one flange and the respective shaft.

2. An aggregate as defined in claim 1, wherein said prime mover is an electric motor.

3. An aggregate as defined in claim 1, further comprising blocking means for preventing the rotation of at least one of said shafts counter to said predetermined direction.

4. An aggregate as defined in claim 1, wherein said output shaft is located at a level above said second shaft.

5. An aggregate as defined in claim 1, wherein said means for rotating said second flange comprises mating projections including projections provided on said flanges.

6. An aggregate as defined in claim 1, further comprising blocking means for preventing rotation of said one flange counter to said predetermined direction, said blocking means being coaxial with and surrounding said overrunning clutch means.

7. An aggregate as defined in claim 1, further comprising radial and thrust bearing means for the shaft including said one flange and radial bearing means for the other of said shafts.

8. An aggregate as defined in claim 6, wherein said first and said second antifriction bearing means each comprise a pair of antifriction bearings axially spaced from each other, said overrunning clutch being located between the pair of antifriction bearings of said second antifriction bearing means and said blocking means being located between the pair of antifriction bearings of said first antifriction bearing means.

* * * * *